(12) United States Patent
Guo et al.

(10) Patent No.: US 12,551,577 B2
(45) Date of Patent: Feb. 17, 2026

(54) 7-ETHYL-10-HYDROXYCAMPTOTHECIN DRUG PRECURSOR WITH FLUORESCENCE ACTIVITY, AND PREPARATION METHOD AND USE THEREOF

(71) Applicant: SOOCHOW UNIVERSITY, Suzhou (CN)

(72) Inventors: Zhengqing Guo, Suzhou (CN); Yangyang Huang, Suzhou (CN); Dandan Ji, Suzhou (CN); Han Xu, Suzhou (CN); Hui He, Suzhou (CN); Dingding Ai, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 594 days.

(21) Appl. No.: 17/927,722

(22) PCT Filed: Dec. 30, 2021

(86) PCT No.: PCT/CN2021/143135
§ 371 (c)(1),
(2) Date: Nov. 24, 2022

(87) PCT Pub. No.: WO2023/097854
PCT Pub. Date: Jun. 8, 2023

(65) Prior Publication Data
US 2024/0156990 A1   May 16, 2024

(30) Foreign Application Priority Data
Dec. 1, 2021 (CN) .......................... 202111455607.5

(51) Int. Cl.
*A61K 49/00* (2006.01)
*A61K 47/54* (2017.01)
(52) U.S. Cl.
CPC ........ *A61K 49/0021* (2013.01); *A61K 47/545* (2017.08); *A61K 49/0052* (2013.01)

(58) Field of Classification Search
CPC ............ A61K 49/0052; A61K 47/0545; A61K 41/0021; A61K 41/0057
See application file for complete search history.

(56) References Cited

FOREIGN PATENT DOCUMENTS

| CN | 103755753 A | 4/2014 |
| CN | 112047952 A | 12/2020 |
| CN | 112920210 A | 6/2021 |

OTHER PUBLICATIONS

Yuan et al., Nano Res., 2020, 13, p. 503-510. (Year: 2020).*
Liu, Yang et al, "Reduction-responsive fluorescence off-on Bodipy-camptothecin conjugates for self-reporting drug release", Journal of Materials Chemistry B, 2016, DOI: 10.1039/C6TB00009F, pp. 1-7 (Mar. 8, 2016).

* cited by examiner

*Primary Examiner* — Michael G. Hartley
*Assistant Examiner* — Leah H Schlientz
(74) *Attorney, Agent, or Firm* — SZDC Law PC

(57) ABSTRACT

The invention provides a 7-ethyl-10-hydroxycamptothecin drug precursor with fluorescence activity and a preparation method and use thereof. The method involves that a carboxyl group of a boron dipyrromethene dye molecule is condensed with a hydroxyl group at the 10 position of 7-ethyl-10-hydroxycamptothecin, yielding a 7-ethyl-10-hydroxy-camptothecin drug precursor (BDP-SN38) with fluorescent activity. BDP-SN38 shows good solubility and stability in most pharmaceutically acceptable solvents. Compared with SN38, BDP-SN38 exhibits comparable anti-tumor activity, has high tumor uptake capacity, and produces strong green fluorescence with the excitation of visible light, thus providing fluorescence-guided bioimaging and further treatment of residual tumors after drug treatment, and having good application prospects in the research of integrated diagnosis and treatment and effective tumor treatment.

9 Claims, 7 Drawing Sheets acetone chloroform tetrahydrofuran ethyl acetate acetonitrile ethanol

7-ETHYL-10-HYDROXYCAMPTOTHECIN DRUG PRECURSOR WITH FLUORESCENCE ACTIVITY, AND PREPARATION METHOD AND USE THEREOF

This application is the National Stage Application of PCT/CN2021/143135, filed on Dec. 30, 2021, which claims priority to Chinese Patent Application No. 202111455607.5, filed on Dec. 1, 2021, which is incorporated by reference for all purposes as if fully set forth herein.

FIELD OF THE INVENTION

The present invention relates to the field of design and synthesis of antitumor drugs, and particularly to a 7-ethyl-10-hydroxycamptothecin drug precursor with fluorescent activity, and a preparation method and use thereof.

DESCRIPTION OF THE RELATED ART

7-Ethyl-10-hydroxycamptothecin (SN38) is a semi-synthetic natural alkaloid anticancer drug having broad-spectrum and effective antitumor activity. However, due to poor solubility, unstable lactone ring, serious side effect, and other problems, SN38 is greatly limited in clinical use. To overcome the above problems, recently, extensive research is focused on the preparation of SN38 prodrugs. Among them, irinotecan (CPT-11) is the most representative. After uptake, CPT-11 is converted into more active SN38 by carboxylesterase in vivo, which prevents tumor cell growth by inhibiting DNA topoisomerase I (Topo I). However, studies show that the bioavailability of CPT-11 in vivo is low, and only a very small fraction of CPT-11 (about 2-8%) can be efficiently converted into SN-38, resulting in an efficacy of merely $\frac{1}{1000}$ to $\frac{1}{100}$ of that of SN38.

Moreover, at present, there are still many problems to be solved urgently in clinical tumor diagnosis and treatment, such as the choice of the optimum treatment time, real-time monitoring of drug delivery, and evaluation of treatment status, etc. Fluorescence imaging technology is an important detection method, which is widely used in ion detection, bioimaging and medical diagnosis due to the high sensitivity, high specificity, short response time, real-time monitoring and other characteristics. In particular, the system based on small molecule fluorescent dyes can maintain high sensitivity and resolution in highly complex biological systems, thus being an excellent fluorescence imaging tool for biological tissues. In recent years, the boron dipyrromethene dye molecule (BODIPY), due to high molar extinction coefficient, high fluorescence quantum yield and excellent photostability, receives wide interest in the fields of medical diagnosis and treatment.

SUMMARY OF THE INVENTION

To overcome the shortcomings and disadvantages in the prior art, the present invention provides a 7-ethyl-10-hydroxycamptothecin drug precursor with fluorescence activity, and a preparation method and use thereof. The drug precursor is obtained by the condensation of a carboxyl group of a boron dipyrromethene dye molecule BODIPY (BDP) with a hydroxyl group at the 10 position of 7-ethyl-10-hydroxycamptothecin (SN38). BDP-SN38 shows good solubility and stability in a pharmaceutically acceptable solvent. Moreover, compared with SN38, BDP-SN38 exhibits comparable antitumor activity, has high tumor uptake capacity, and produces strong green fluorescence with the excitation of visible light, thus promoting the finding by fluorescence and further treatment of residual tumors after drug treatment.

To solve the above technical problems, the present invention provides the following technical solutions.

In a first aspect, the present invention provides a 7-ethyl-10-hydroxycamptothecin drug precursor with fluorescent activity, having a general chemical structural formula below:

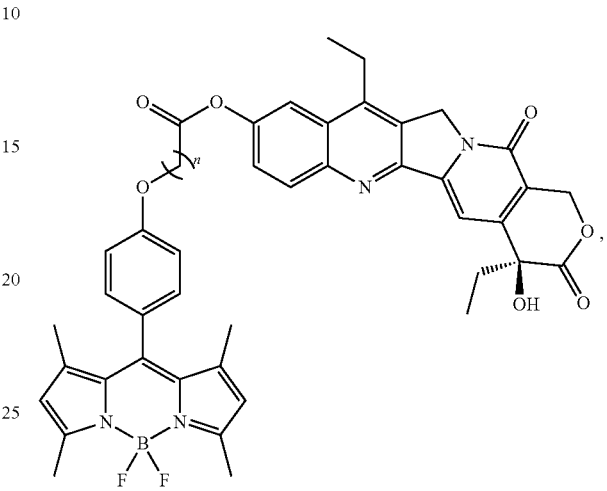

where $n=1-19$, and n is an integer.

The hydroxyl group at position 10 of SN38 is modified by BODIPY with fluorescent activity, and a BDP-SN38 compound with good stability and fluorescence activity is obtained, which exhibits comparable antitumor activity to SN38, has a high tumor uptake capacity, and can realize the tracking of residual tumor after drug treatment.

In a second aspect, the present invention provides a method for preparing the 7-ethyl-10-hydroxycamptothecin drug precursor with fluorescent activity described in the first aspect, which mainly includes Method A and Method B.

Method A comprises the following steps: under nitrogen atmosphere, $S_{A1}$: adding boron dipyrromethene, a condensing agent, and 1-hydroxybenzotriazole to a solvent, and stirring to obtain a mixed solution; and $S_{A2}$: adding 7-ethyl-10-hydroxycamptothecin and a catalyst to the mixed solution, and reacting under stirring, to obtain the 7-ethyl-10-hydroxycamptothecin drug precursor.

Method B comprises the following steps: under nitrogen atmosphere, $S_{B1}$: adding 7-ethyl-10-hydroxycamptothecin and an organic base to a solvent, and reacting under stirring; and $S_{B2}$: adding boron dipyrromethene dissolved in a solvent to the reaction system, and performing a first reaction under stirring; and adding a condensing agent dissolved in a solvent to the reaction system, and performing a second reaction under stirring, to obtain the 7-ethyl-10-hydroxycamptothecin drug precursor.

Preferably, in Method A and Method B, the solvent is N,N-dimethylformamide or/and dichloromethane.

Preferably, in Method A and Method B, the condensing agent comprises one or more of dicyclohexylcarbodiimide, diisopropylcarbodiimide, (2-oximido-cyanoethyl acetate)-N,N-dimethyl-morpholinylurea hexafluorophos-phate, 2-(7-azabenzotriazole)-N,N,N',N'-tetramethylurea hexafluorophosphate, and 1-ethyl-(3-dimethylaminopropyl) carbodiimide, and a hydrochloride thereof.

Preferably, in Method A, the condensing agent is more preferably selected from the group consisting of dicyclohexylcarbodiimide, diisopropylcarbodiimide, and 1-ethyl-(3-dimethylaminopropyl)carbodiimide, and a hydrochloride thereof.

Preferably, in Method B, the condensing agent is preferably (2-oximido-cyanoethyl acetate)-N,N-dimethyl-morpholinylurea hexafluorophos-phate and/or 2-(7-azabenzotriazole)-N,N,N',N'-tetramethylurea hexafluorophos-phate.

Preferably, in Method A and Method B, the molar ratio of the condensing agent to the boron dipyrromethene is 1 to 5:1.

Preferably, in Method A, the molar ratio of 1-hydroxybenzotriazole to boron dipyrromethene is 1 to 3:1.

Preferably, in Method A and Method B, the molar ratio of 7-ethyl-10-hydroxycamptothecin and boron dipyrromethene is 2 to 3:1.

Preferably, in $S_{A1}$ and $S_{A2}$, the stirring occurs at a temperature of 20 to 30° C.

Preferably, in $S_{A1}$, the stirring time is not less than 20 min.

Preferably, in $S_{A2}$, the time of reaction under stirring is 10 to 24 h.

Preferably, in $S_{A2}$, the catalyst is 4-dimethylaminopyridine or 4-pyrrolidinopyridine.

Preferably, in $S_{B1}$, the organic base is one selected from triethyl amine, diisopropyl amine, and pyridine.

Preferably, in $S_{B1}$, the molar ratio of 7-ethyl-10-hydroxycamptothecin to N,N-diisopropylethylamine is 1:1 to 3.

Preferably, in $S_{B1}$, the temperature of reaction under stirring is 35-65° C., and the time of reaction under stirring is 10 to 30 min.

Preferably, in $S_{B2}$, the temperature of the first reaction under stirring is −10 to 0° C., and the time of the first reaction under stirring is 10 to 60 min.

Preferably, in $S_{B2}$, the second reaction under stirring is specifically: stirring at −10 to 0° C. for 2 to 4 h, and then stirring at 20 to 30° C. for 6 to 24 h.

In $S_{B2}$, boron dipyrromethene and the condensing agent are added to the solvent first, and then the corresponding solution is added to the reaction system, which is beneficial to the increase of the reaction rate.

Preferably, the preparation method further includes a process of extracting the product obtained in the reaction under stirring in $S_{A2}$ or $S_{B3}$ and separating by column chromatography, where the solvent used in the extraction is dichloromethane and a saturated sodium carbonate solution, and the solvent used in the column chromatography is a mixed solvent of dichloromethane and ethyl acetate.

In a third aspect, the present invention provides use of the 7-ethyl-10-hydroxycamptothecin drug precursor with fluorescent activity described in the first aspect and a pharmaceutical composition thereof in the tumor diagnosis and treatment.

Compared with related art, the present invention has the following beneficial effects.

1. The present invention provides two different preparation methods, in which a 7-ethyl-10-hydroxycamptothecin drug precursor (BDP-SN38) with fluorescent activity is obtained by the condensation of a carboxyl group of a boron dipyrromethene dye molecule BODIPY with the hydroxyl group at position 10 of 7-ethyl-10-hydroxycamptothecin (SN38). BDP-SN38 shows good solubility and stability in a pharmaceutically acceptable solvent, to alleviate the problem of poor solubility of SN38. Moreover, the BDP-SN38 compound exhibits an antitumor activity comparable to that of SN38 and the same fluorescence activity as BDP, and produces strong green fluorescence with the excitation of visible light.

2. The BDP-SN38 compound prepared in the present invention, as a conjugate of a photosensitizer and a chemotherapeutic agent, has high tumor uptake capacity, and can realize the tracking of residual tumor after drug treatment. Moreover, it can be used as a synergistic drug for chemotherapy and phototherapy to increase the killing effect on tumors.

DETAILED DESCRIPTION OF THE PREFERRED EMBODIMENTS

Figure 1:
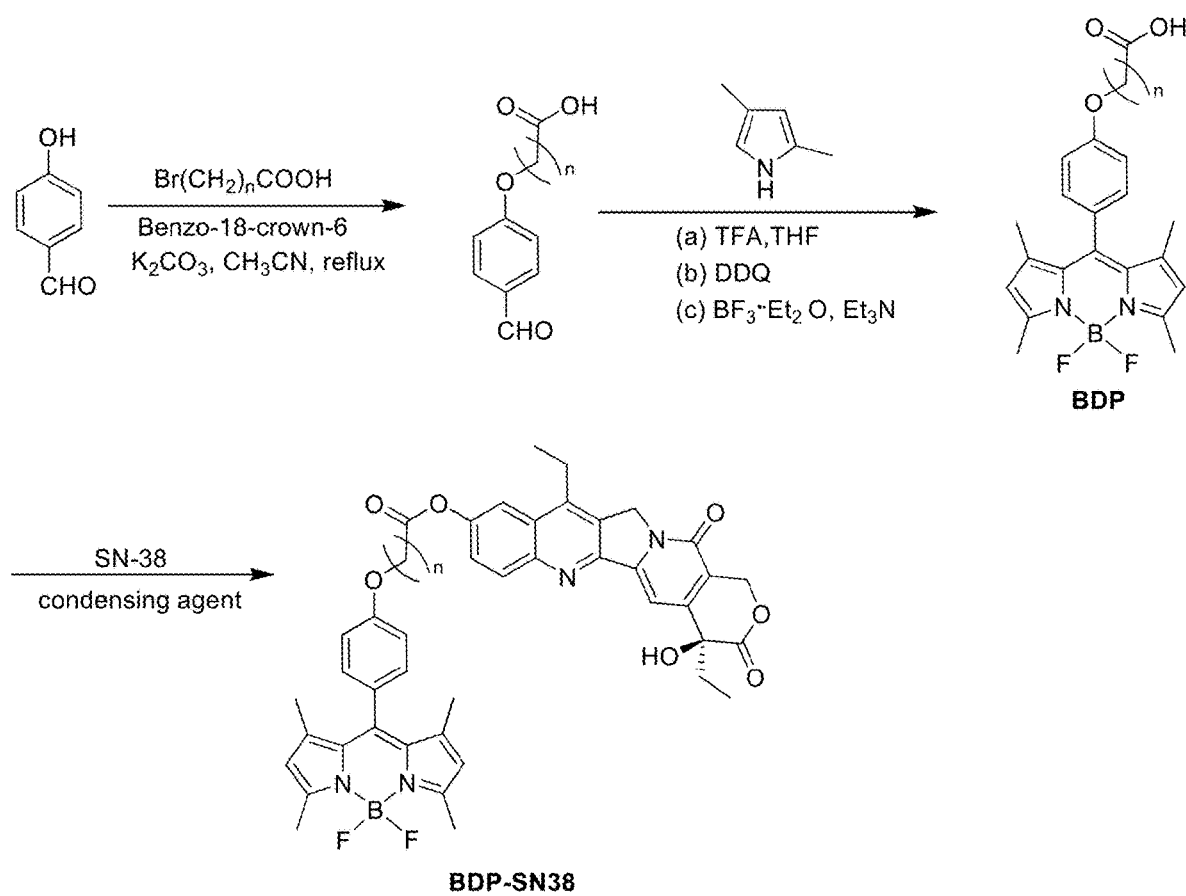
FIG. 1 shows the synthesis route of the 7-ethyl-10-hydroxycamptothecin drug precursor BDP-SN38.

The present invention will be further described below with reference to the accompanying drawings and specific examples, so that those skilled in the art can better understand and implement the present invention; however, the present invention is not limited thereto.

Unless otherwise stated, all technical and scientific terms used herein have the same meaning as commonly understood by persons skilled in the art to which the present invention pertains. The terms used in the descriptions of the present invention are for the purpose of describing specific embodiments only and are not intended to limit the present invention. The term "and/or" as used herein includes any and all combinations of one or more of the listed related items.

Unless otherwise stated, the experimental methods given in examples below are all conventional methods. The materials, and reagents involved in the examples are commercially available, unless otherwise specified.

The BDP used in the following examples are all prepared by the following methods. The specific preparation process is as follows.

(1) p-hydroxybenzaldehyde, 6-bromohexanoic acid and potassium carbonate are added to a reaction vessel, and then benzo-18-crown-6-ether and acetonitrile are added, heated to reflux and reacted for 24 h, and then filtered. The obtained solid is rinsed with acetonitrile.

Then the solid is dissolved in water, and 4 mol/L hydrochloric acid is added until no bubbles are generated. After filtration, the obtained white filter residue is 6-(4-formylphenoxy)hexanoic acid.

(2) 6-(4-Formylphenoxy)hexanoic acid and 2,4-dimethylpyrrole are added to a reaction vessel, and then tetrahydrofuran and trifluoroacetic acid are added, followed by a solution of 2,3-dichloro-5,6-dicyano-p-benzoquinone dissolved in tetrahydrofuran. After reaction under stirring at room temperature for 12 h, triethylamine is added, and boron trifluoride etherate is added dropwise in an ice-water bath and react overnight. After the reaction, the reaction solution is filtered through a sandboard Buchner funnel, concentrated by rotary evaporation under reduced pressure, taken up in a small amount of dilute hydrochloric acid and stirred for 3 h. After further concentration, the concentrate is extracted with ethyl acetate, and the extract is subjected to column chromatography (SiO$_2$; eluent: petroleum ether/dichloromethane) to obtain the compound BODIPY.

Example 1

Under nitrogen atmosphere, the compound BODIPY was dissolved in N,N-dimethylformamide of 50 times weight, and then 1-ethyl-(3-dimethyl-aminopropyl)carbodiimide hydrochloride (at a molar ratio of 3:1 to BODIPY) and 1-hydroxybenzotriazole were added, and stirred at room temperature for half an hour. Subsequently, 7-ethyl-10-hydroxycamptothecin (SN-38, at a molar ratio of 1:1 to BODIPY) and 4-dimethylaminopyridine were added, and stirred at room temperature for 12 h. After the reaction, the reaction solution was extracted and subjected to column chromatography (dichloromethane:methanol), to obtain the compound BODIPY-SN38 yield 34%.

Example 2

Under nitrogen atmosphere, the compound BODIPY was dissolved in N,N-dimethylformamide of 50 times weight, and then dicyclohexylcarbodiimide (at a molar ratio of 1.2:1 to BODIPY) and 1-hydroxybenzotriazole were added, and stirred at room temperature for half an hour. Subsequently, 7-ethyl-10-hydroxycamptothecin (at a molar ratio of 1:1 to BODIPY) and 4-dimethylaminopyridine were added, and stirred at room temperature for 12 h. After the reaction, the reaction solution was extracted and subjected to column chromatography (dichloromethane:methanol), to obtain the compound BODIPY-SN38, yield 20%.

Example 3

Under nitrogen atmosphere, the compound BODIPY was dissolved in N,N-dimethylformamide of 50 times weight, and then 1-ethyl-(3-dimethyl-aminopropyl)carbodiimide hydrochloride (at a molar ratio of 5:1 to BODIPY) and 1-hydroxybenzotriazole were added, and stirred at room temperature for half an hour. Subsequently, 7-ethyl-10-hydroxycamptothecin (at a molar ratio of 2:1 to BODIPY) and 4-dimethylaminopyridine were added, and stirred at room temperature for 12 h. After the reaction, the reaction solution was extracted and subjected to column chromatography (dichloromethane:methanol), to obtain the compound BODIPY-SN38, yield 60%.

Example 4

Under nitrogen atmosphere, the compound BODIPY was dissolved in N,N-dimethylformamide of 50 times weight, and then 1-ethyl-(3-dimethylaminopropyl)carbodiimide hydrochloride (at a molar ratio of 5:1 to BODIPY) and 1-hydroxybenzotriazole were added, and stirred at room temperature for half an hour. Subsequently, 7-ethyl-10-hydroxycamptothecin (at a molar ratio of 3:1 to BODIPY) and 4-dimethylaminopyridine were added, and stirred at room temperature for 12 h. After the reaction, the reaction solution was extracted with dichloromethane and a saturated sodium carbonate solution, and subjected to column chromatography (dichloromethane:ethyl acetate), to obtain the compound BODIPY-SN38, yield 65%.

Example 5

Under nitrogen atmosphere, the compound BODIPY was dissolved in dichloromethane of 50 times weight, and then 1-ethyl-(3-dimethyl-aminopropyl)carbodiimide hydrochloride (at a molar ratio of 5:1 to BODIPY) and 1-hydroxybenzotriazole were added, and stirred at room temperature for half an hour. Subsequently, 7-ethyl-10-hydroxycamptothecin (at a molar ratio of 2:1 to BODIPY) and 4-dimethylaminopyridine were added, and stirred at room temperature for 12 h. After the reaction, the reaction solution was extracted and subjected to column chromatography (dichloromethane:methanol), to obtain the compound BODIPY-SN38, yield 56%.

Example 6

Under nitrogen atmosphere, 7-ethyl-10-hydroxycamptothecin (at a molar ratio of 1.5:1 to BODIPY) was dissolved in N,N-dimethylformamide (at a weight ratio of 50:1 to BODIPY), and then triethyl amine (at a molar ratio of 3:1 to BODIPY) was added, and stirred at 50° C. for 20 min. Then, a solution of BODIPY dissolved in DMF (the weight ratio of DMF to BODIPY is 50:1) was added, and stirred at −5° C. for 30 min. Then a solution of (2-oximido-cyanoethyl acetate)-N,N-dimethyl-morpholinylurea hexafluorophosphate dissolved in DMF was added, stirred at −10 to 0° C. for 3 h, then transferred to room temperature, and stirred for 12 h. After the reaction, the reaction solution was extracted with dichloromethane and a saturated sodium carbonate solution, and subjected to column chromatography (dichloromethane:ethyl acetate), to obtain the compound BODIPY-SN38, yield 57%.

Example 7

Under nitrogen atmosphere, 7-ethyl-10-hydroxycamptothecin (at a molar ratio of 1.5:1 to BODIPY) was dissolved in N,N-dimethylformamide (at a weight ratio of 50:1 to BODIPY), and then N,N-diisoproyl ethylamine (at a molar ratio of 3:1 to BODIPY) was added, and stirred at 50° C. for 20 min. Then, a solution of BODIPY dissolved in DMF (the weight ratio of DMF to BODIPY is 50:1) was added, and stirred at −5° C. for 30 min. Then a solution of (2-oximido-cyanoethyl acetate)-N,N-dimethyl-morpholinylurea hexafluorophosphate dissolved in DMF was added, stirred at −10 to 0° C. for 3 h, then transferred to room temperature, and stirred for 12 h. After the reaction, the reaction solution was extracted with dichloromethane and a saturated sodium carbonate solution, and subjected to column chromatography (dichloromethane:ethyl acetate), to obtain the compound BODIPY-SN38, yield 60%.

Characterization and Performance Test

Figure 2:
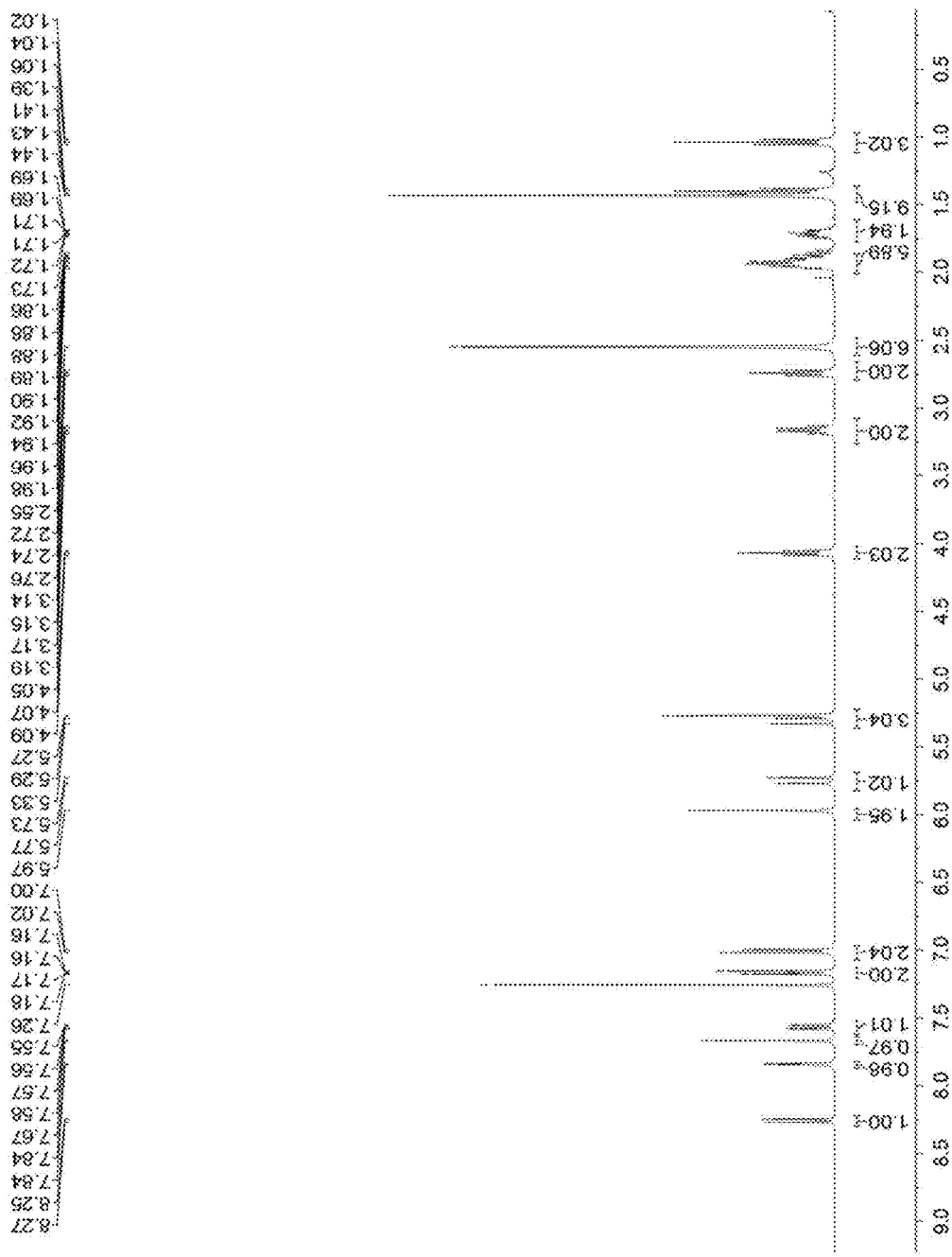
FIG. 2 shows a $^1$H NMR spectrum of the 7-ethyl-10-hydroxycamptothecin drug precursor BDP-SN38.

BODIPY-SN38 prepared in Example 4 was characterized by spectroscopy. The characterization results are shown in FIG. 2. $^1$H NMR (400 MHz, CDCl$_3$): δ 8.26 (d, J=9.2 Hz, 1H), 7.84 (d, J=2.4 Hz, 1H), 7.67 (s, 1H), 7.57 (dd, J=9.2, 2.5 Hz, 1H), 7.17 (d, J=8.7 Hz, 2H), 7.01 (d, J=8.7 Hz, 2H), 5.97 (s, 2H), 5.75 (d, J=16.3 Hz, 1H), 5.31 (d, J=16.3 Hz, 1H), 5.27 (s, 2H), 4.07 (t, J=6.3 Hz, 2H), 3.16 (q, J=7.7 Hz, 2H), 2.74 (t, J=7.4 Hz, 2H), 2.55 (s, 6H), 1.81-2.00 (m, 6H), 1.66-1.77 (m, 2H), 1.44 (s, 4H), 1.41 (t, J=7.8 Hz, 3H), 1.04 (t, J=7.4 Hz, 3H).

Figure 3:
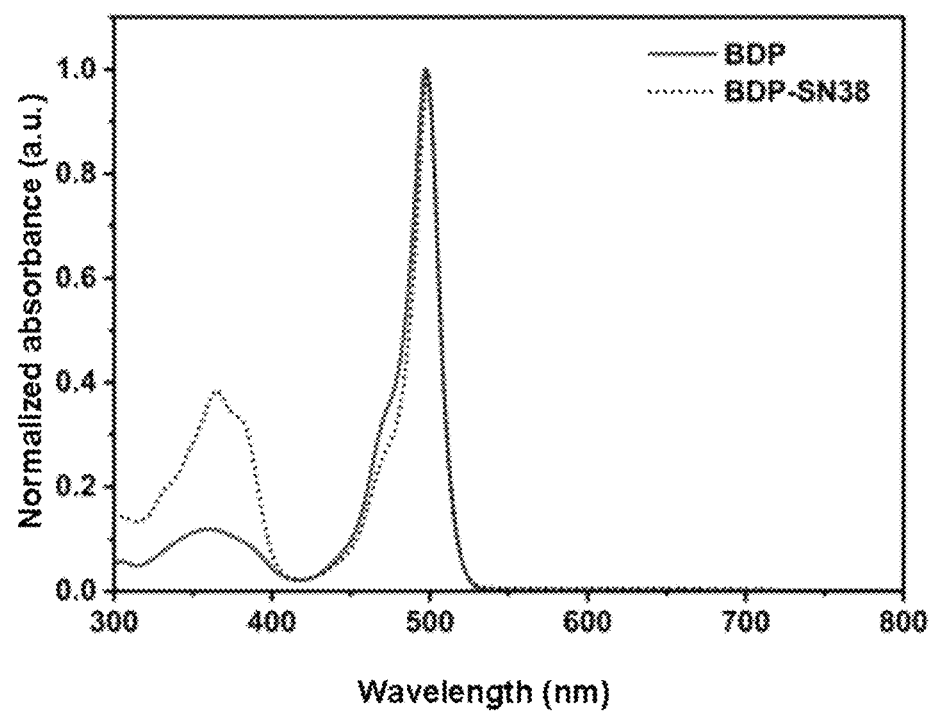
FIG. 3 shows absorption spectra of the 7-ethyl-10-hydroxycamptothecin drug precursor BDP-SN38 and BDP.
Figure 4:
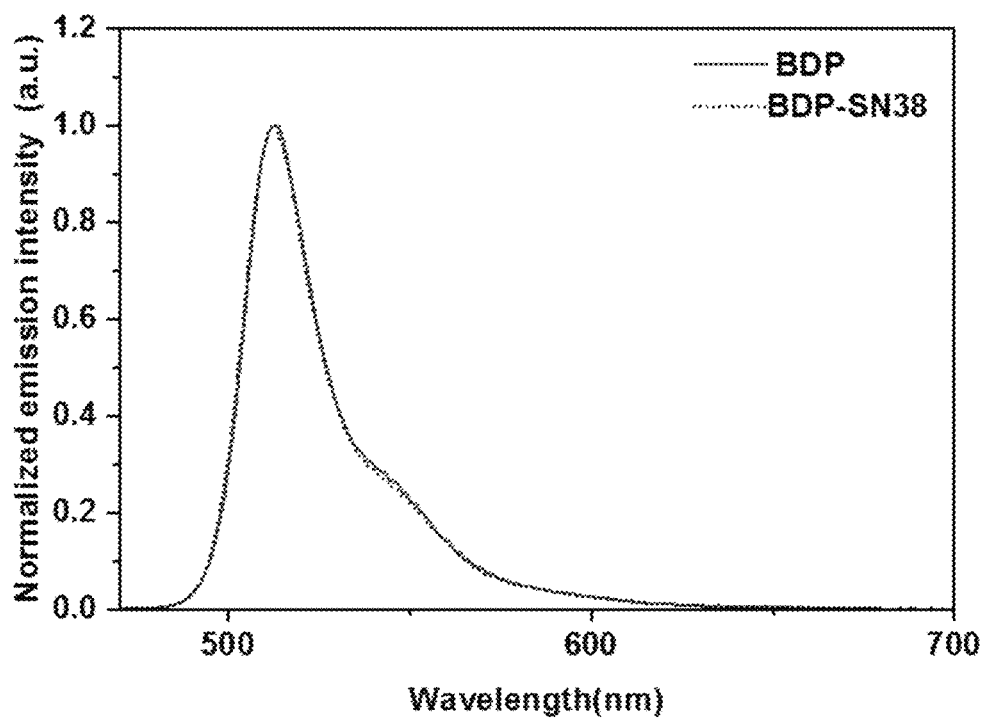
FIG. 4 shows emission spectra of the 7-ethyl-10-hydroxycamptothecin drug precursor BDP-SN38 and BDP.

(1) Study on Photophysical Properties 1 g of BDP and BODIPY-SN38 (BDP-SN38) were weighed and dissolved in 10 mL of DMF, respectively. The concentrations of the two solutions were adjusted, to have an absorbance of 0.2-0.8 at the maximum absorption wavelength. The absorption spectra of the two materials were tested (as shown in FIG. 3), and, then the emission spectra of the two solutions after concentration adjustment were tested. The results are shown in FIG. 4. The absorption spectra of the two compounds are basically coincident, and the emission spectra are completely coincident, indicating that the BDP-SN38 compound has similar fluorescence properties to BDP.

Figure 5:
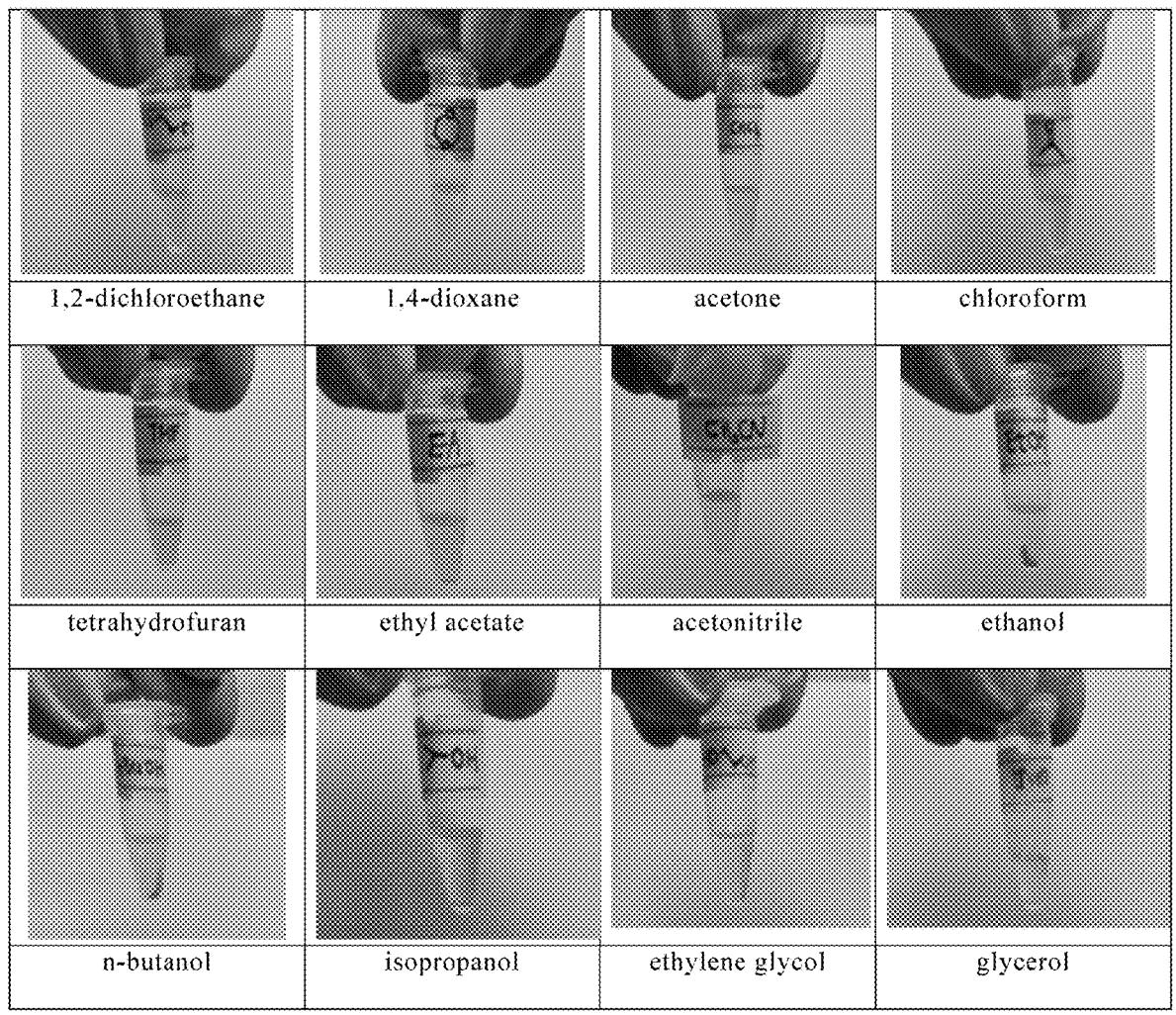
FIG. 5 shows the solubility test of the 7-ethyl-10-hydroxycamptothecin drug precursor BDP-SN38 in various pharmaceutically acceptable solvents.

(2) Solubility and Stability Test each 1 mg of BDP-SN38 was weighed into a 1.5 ml centrifuge tube, respectively. 300 μl of a different solvent (1,2-dichloroethane, 1,4-dioxane, acetone, and chloroform, tetrahydrofuran, ethyl acetate, acetonitrile, and ethanol, n-butanol, isopropanol, ethylene glycol, or glycerol) was added to each centrifuge tube, shaken for one minute, and centrifuged for three minutes. Whether a precipitate is formed in various BDP-SN38 solutions and the color of the solution were observed and record. The dissolution in various solvents is shown in FIG. 5. BDP-SN38 is soluble in most pharmaceutically acceptable solvents.

The weights of the two centrifuge tubes were recorded on an analytical balance, respectively. Each 2 mg of BDP-SN38 and SN38 were weighed into a centrifuge tube respectively. 300 μL of chloroform was added to the centrifuge tube, shaken, and centrifuged. The dissolution of BDP-SN38 and SN38 in the solution was observed. The solubility of different compounds in chloroform was estimated by the weight loss method (where the specific operation includes pipetting the solution, and lyophilizing the remaining solid and weighing). The solubility of BDP-SN38 in chloroform is calculated to be greater than 6.7 mg/mL, and SN38 is hardly soluble in chloroform.

Figure 6:
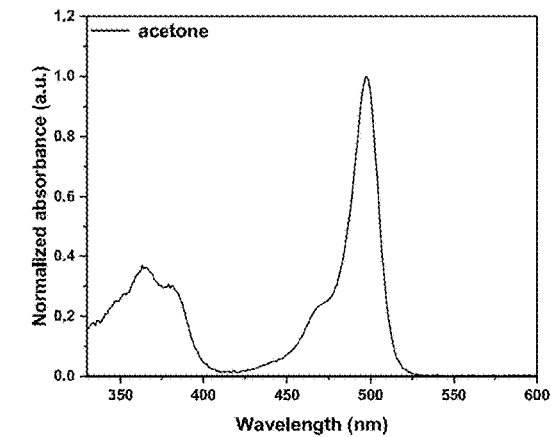
FIG. 6 shows the UV-Vis absorption spectra of the 7-ethyl-10-hydroxycamptothecin drug precursor BDP-SN38 in various pharmaceutically acceptable solvents.
Figure 6:
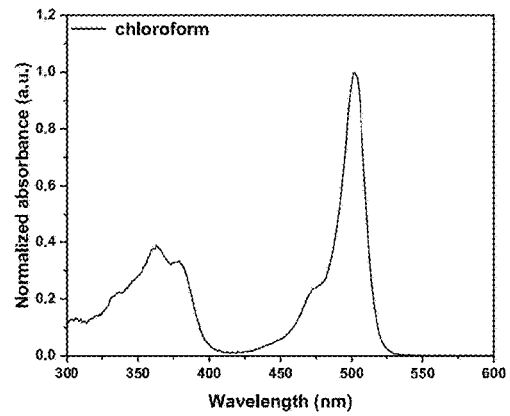
Figure 6:
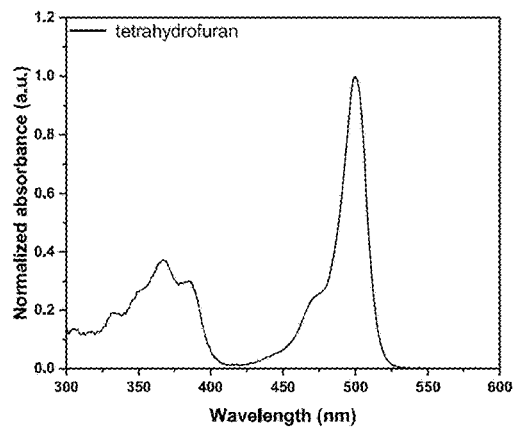
Figure 6:
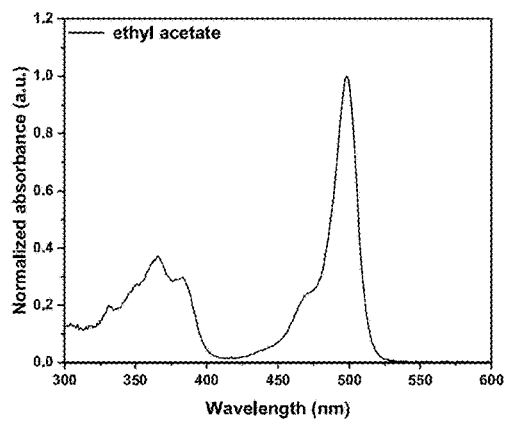
Figure 6:
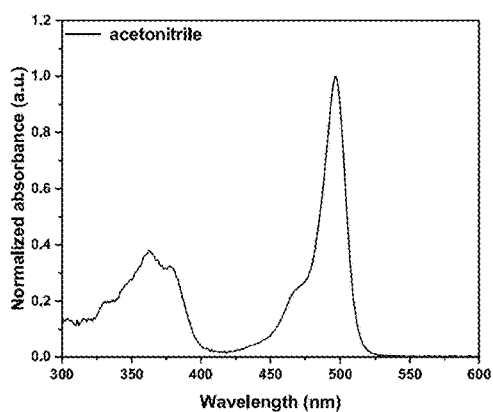
Figure 6:
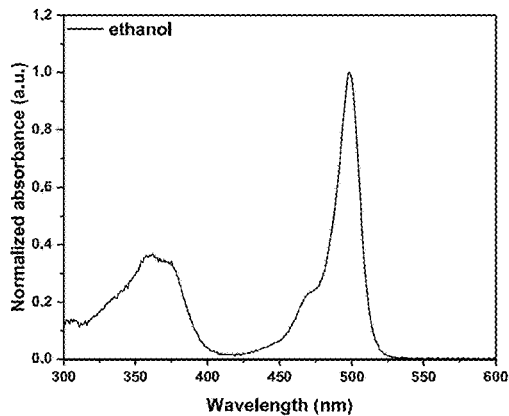

12 μl of the supernatant after centrifugation of various BDP-SN38 solutions was measured with a pipette, respectively. A corresponding solvent (acetone, chloroform, tetrahydrofuran, ethyl acetate, acetonitrile, and ethanol) was added to prepare 600 μL of a dilute solution. The solution was fed to a micro-quartz cuvette to measure the absorption spectrum. The test results are shown in FIG. 6. Compared with FIG. 3, it can be seen that the UV-Vis absorption spectra of BDP-SN38 in different solvents are consistent, indicating that BDP-SN38 is highly stable in different types of solvents.

(3) Cytotoxicity Test

4T1 cells in the logarithmic growth phase were taken and plated in a 96-well plate in 100 μL/well at a seeding density $6\times10^3$ cells/mL. The cells were incubated in a cell incubator at a constant temperature for 12 h. After confirming that the cells were attached, the culture medium was poured off. The cells were washed 1-2 times with phosphate buffer, and 100 μl per well of a BDP-SN38 solution, SN38 solution or irinotecan solution prepared in the culture medium was added. A blank solution and corresponding compound solutions of various concentrations were prepared. The concentrations of the BDP-SN38 solution and the SN38 solution were 0.16, 0.31, 0.63, 1.25, 2.5, 5.0, and 10.0 μM respectively. The concentrations of the irinotecan were 1.25, 2.5, 5, 10, 20, 40, and 80 μM respectively. 4 replicate wells were set for each concentration. After 48 h of incubation in the incubator, the culture medium was changed. 20 μL of 5 mg/mL 3-(4,5-dimethylthiazole-2)-2,5-diphenyltetrazolium bromide in a phosphate buffer was added. After 4 h, the culture medium was discarded. 200 μL of DMSO was added, shaken for 10 min, and measured for the absorbance at 490 nm on a microplate reader.

The test results are shown in FIG. 5. The BDP-SN38 compound has an IC$_{50}$ value comparable to that of SN38, and much lower than that of the anticancer drug irinotecan, and has a stronger killing effect on tumor cells.

(4) Cell Uptake Test

4T1 cells in logarithmic growth phase were plated in 2 confocal dishes, tach having $1.0\times10^4$ cells. The cells were incubated in a cell incubator at a constant temperature for 12 h. After confirming that the cells were attached, the culture medium was poured off. The cells were washed 1-2 times with a phosphate buffer, and then a BDP-SN38 solution (1 μM, 1 mL) and SN38 solution (1 μM, 1 mL) and were added respectively. The cells were incubated in a cell incubator for 24 h, and then washed 1-2 times with a phosphate buffer. After that, the distribution of BDP-SN38 in 4T1 cells was observed under a laser microscope. As shown in FIG. 6, BDP-SN38 can be well absorbed by 4T1 cells, and the distribution of cells can be observed by the fluorescence signal of BDP-SN38 under the laser confocal microscope.

Figure 7:
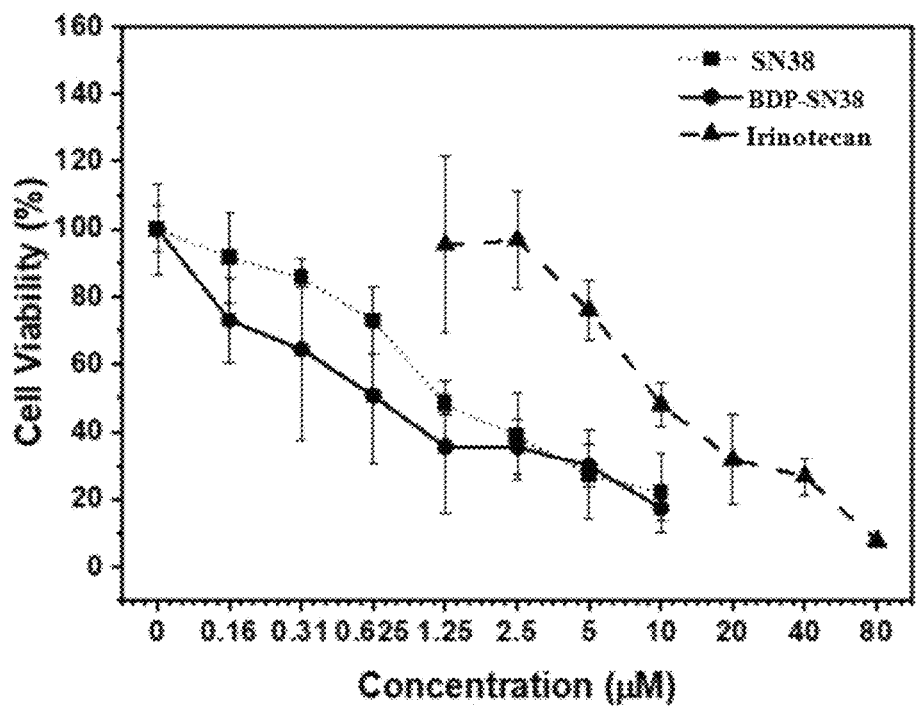
FIG. 7 shows the toxicity test of the 7-ethyl-10-hydroxycamptothecin drug precursor BDP-SN38, SN38, and irinotecan on 4T1 cells.
Figure 8:
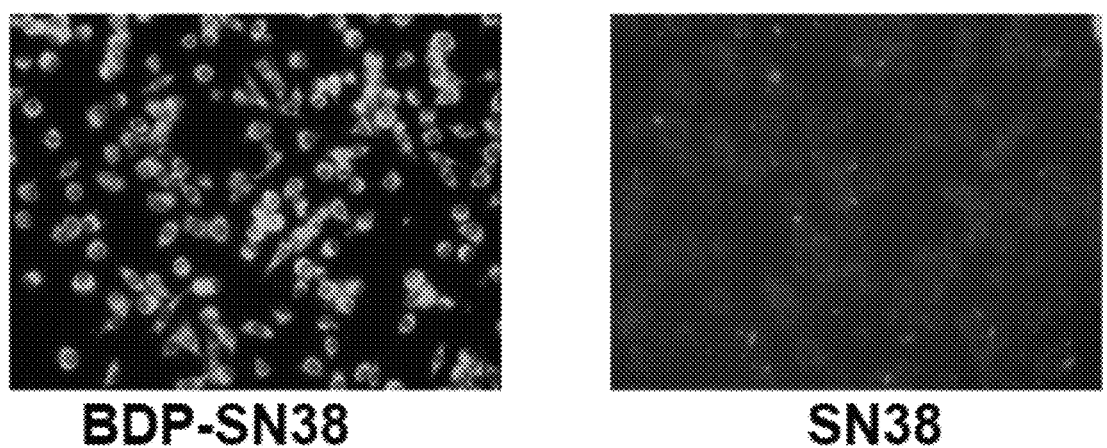
FIG. 8 shows a confocal fluorescence image of the 7-ethyl-10-hydroxycamptothecin drug precursor BDP-SN38 after uptake by 4T1 cells.
Figure 9:
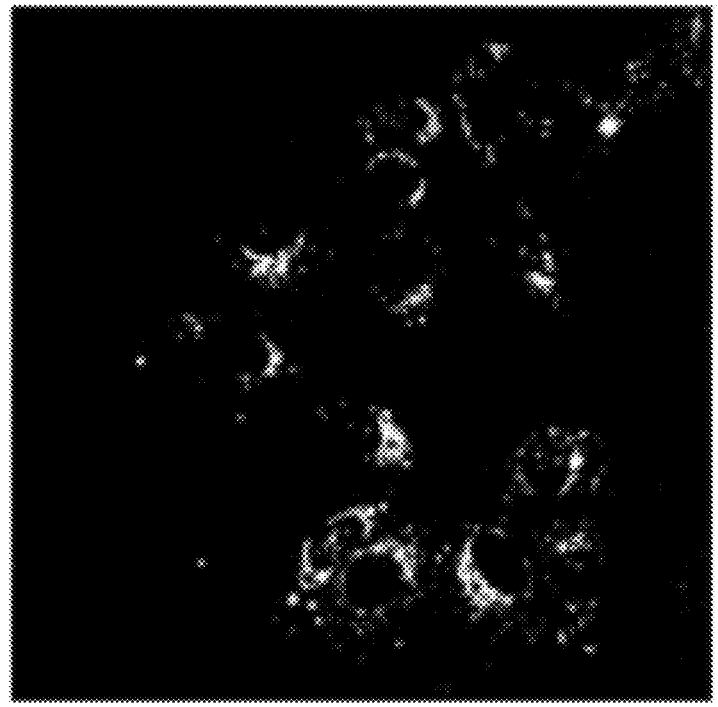
FIG. 9 shows a confocal fluorescence images of the 7-ethyl-10-hydroxycamptothecin drug precursor BDP-SN38 and SN38 after uptake by the MCF7 cells.

MCF-7 cells were cultured with the BDP-SN38 solution prepared in the medium by the above method, and the distribution of BDP-SN38 in MCF-7 cells was observed under a laser microscope. As shown in FIG. 7, BDP-SN38 can be well absorbed by MCF-7 cells, and the distribution of MCF-7 cells is further observed by the fluorescence signal of BDP-SN38.

The above-described embodiments are merely preferred embodiments for the purpose of fully illustrating the present invention, and the scope of the present invention is not limited thereto. Equivalent substitutions or modifications can be made by those skilled in the art based on the present invention, which are within the scope of the present invention as defined by the claims. The scope of the present invention is defined by the appended claims.

What is claimed is:

1. A 7-ethyl-10-hydroxycamptothecin drug precursor with fluorescent activity, having a general chemical structural formula of:

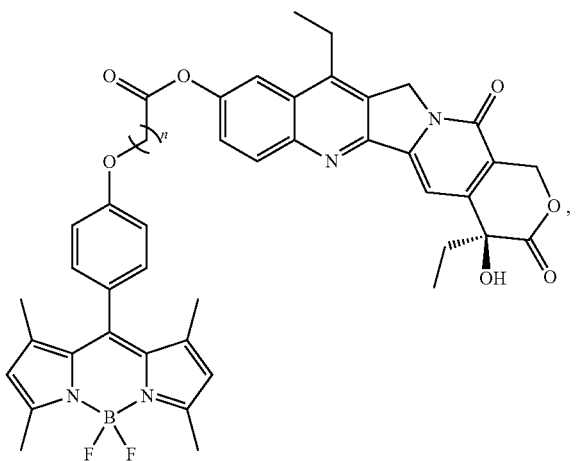

wherein n=1-19, and n is an integer.

2. A method for preparing a 7-ethyl-10-hydroxycamptothecin drug precursor with fluorescent activity according to claim 1, comprising a method is selected from the group consisting of Method A and Method B,
wherein Method A comprises steps of: under nitrogen atmosphere,
$S_{A1}$: adding boron dipyrromethene, a condensing agent, and 1-hydroxybenzotriazole to a solvent, and stirring to obtain a mixed solution; and
$S_{A2}$: adding 7-ethyl-10-hydroxycamptothecin and a catalyst to the mixed solution, and reacting under stirring, to obtain the 7-ethyl-10-hydroxycamptothecin drug precursor; and
Method B comprises steps of: under nitrogen atmosphere,
$S_{B1}$: adding 7-ethyl-10-hydroxycamptothecin and an organic base to a solvent, and reacting under stirring; and
$S_{B2}$: adding boron dipyrromethene dissolved in a solvent to the reaction system, and performing a first reaction under stirring; and adding a condensing agent dissolved in a solvent to the reaction system, and performing a second reaction under stirring, to obtain the 7-ethyl-10-hydroxycamptothecin drug precursor.

3. The method for preparing a 7-ethyl-10-hydroxycamptothecin drug precursor with fluorescent activity according to claim 2, wherein in Method A and Method B, the solvent is N,N-dimethylformamide and/or dichloromethane; and the condensing agent is selected from the group consisting of dicyclohexylcarbodiimide, diisopropylcarbodiimide, (2-oximido-cyanoethyl acetate)-N,N-dimethyl-morpholinylurea hexafluorophosphate, 2-(7-azabenzo-triazole)-N,N,N',N'-tetramethylurea hexafluorophosphate, and 1-ethyl-(3-dimethyl-aminopropyl) carbodiimide, and a hydrochloride thereof.

4. The method for preparing a 7-ethyl-10-hydroxycamptothecin drug precursor with fluorescent activity according to claim 2, wherein in $S_{A1}$, the stirring time is not less than 20 min.

5. The method for preparing a 7-ethyl-10-hydroxycamptothecin drug precursor with fluorescent activity according to claim 2, wherein in $S_{A2}$, the catalyst is 4-dimethylaminopyridine or 4-pyrrolidinopyridine; and the time of reaction under stirring is 10 to 24 h.

6. The method for preparing a 7-ethyl-10-hydroxycamptothecin drug precursor with fluorescent activity according to claim 2, wherein in $S_{B1}$, the organic base is selected from triethyl amine, diisopropyl amine, and pyridine.

7. The method for preparing a 7-ethyl-10-hydroxycamptothecin drug precursor with fluorescent activity according to claim 2, wherein in $S_{B1}$, the temperature of reaction under stirring is 35-65° C., and the time of reaction under stirring is 10 to 30 min.

8. The method for preparing a 7-ethyl-10-hydroxycamptothecin drug precursor with fluorescent activity according to claim 2, wherein in $S_{B2}$, the temperature of the first reaction under stirring is −10 to 0° C., and the time of the first reaction under stirring is 10 to 60 min; and the second reaction under stirring comprises stirring at −10 to 0° C. for 2 to 4 h, and then stirring at 20 to 30° C. for 6 to 24 h.

9. The method for preparing a 7-ethyl-10-hydroxycamptothecin drug precursor with fluorescent activity according to claim 2, further comprising extracting the product obtained in the reaction under stirring in $S_{A2}$ or $S_{B3}$ and separating the product by column chromatography, wherein a solvent used in the extraction is dichloromethane and a saturated sodium carbonate solution, and a solvent used in the column chromatography is a mixed solvent of dichloromethane and ethyl acetate.

* * * * *